Jan. 21, 1964     P. E. L. FRODE     3,118,632
FISHING REEL

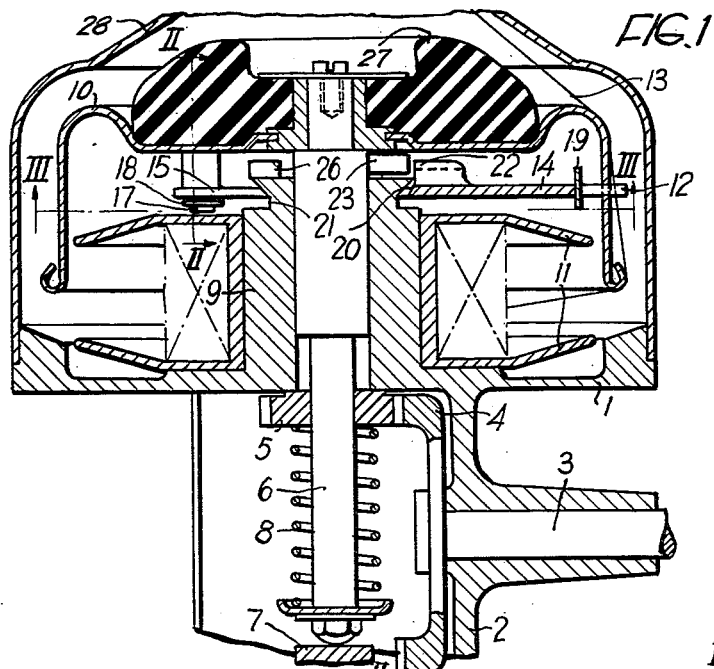
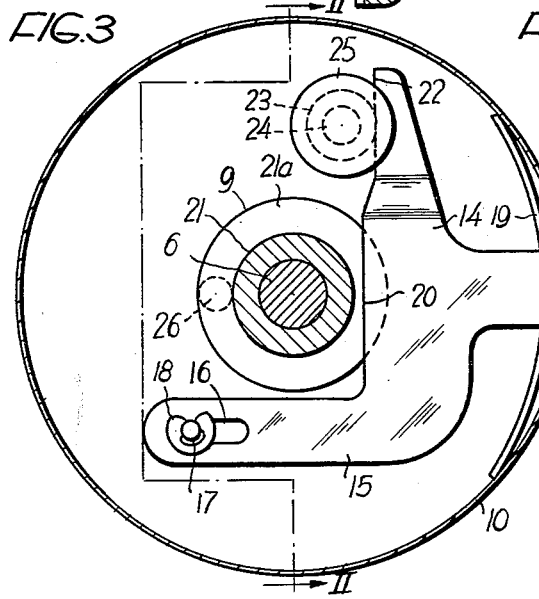
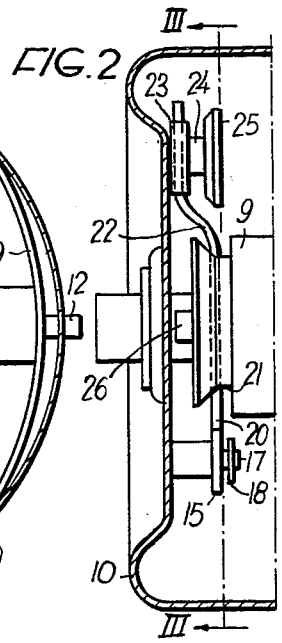

Filed June 30, 1961     2 Sheets-Sheet 2

INVENTOR.
PER ENAR LENNART FRODE
BY

3,118,632
FISHING REEL
Per Enar Lennart Frode, Svangsta, Sweden, assignor to Ab Urfabriken, Svangsta, Sweden
Filed June 30, 1961, Ser. No. 131,453
Claims priority, application Sweden July 5, 1960
4 Claims. (Cl. 242—84.2)

This invention relates to fishing reels of the type having a winding member rotatable about the line spool and containing an extensible pin for engaging line to wind it about the spool.

It is an object of the invention to provide novel mechanism to positively move the pin to the operative position upon rotation of the winding member and then maintain the pin in such position without any frictional drag or loss.

It is an object of the invention to provide positive means for extending the pin and separate positive means for retaining the pin in its extended position.

It is an object of the present invention to provide a fishing reel of the general type above described, in which the pin slide does not rest against any stationary part during the winding up of the line, but against a part which rotates together with the line guide cap and the pin slide.

To this purpose, the abutment, maintaining the pin slide in the radially outer position, is mounted on the line guide cap and the pin slide, which is not only radially displaceable but also axially rockatable relative to the line guide cap, is capable of cooperation with a stationary guide, adapted at the axial displacement of the line guide cap together with the abutment to move the pin slide axially away from the abutment.

An embodiment of the invention is illustrated in the accompanying drawings, in which FIG. 1 is an axial section through the major part of a fishing reel.

FIG. 2 is a partial section along line II—II in FIG. 1 with parts removed for clarity.

FIG. 3 is a cross section essentially along line III—III in FIGS. 1 and 2.

Figure 5:
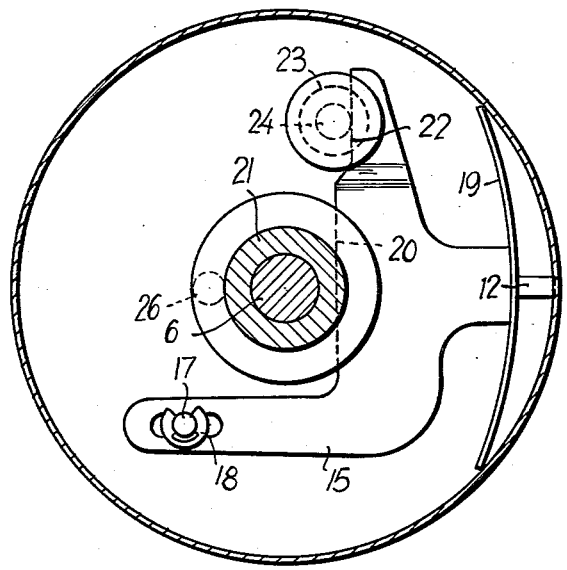
FIGS. 4 and 5 show in a manner similar to FIGS. 2 and 3 with the pin slide in another position.

Referring to FIGS. 1 to 3 the reel has a casing 1, having at the underside a gear housing 2 in which the shaft 3 of a crank (not shown but of the kind illustrated in the U.S. specification 2,911,165) supports a driving gear 4 engaging a gear 5 slidably but not rotatably mounted on the lower end of a shaft 6 journalled in the reel housing 1, said lower shaft end extending into the gear housing 2 and cooperating at its lower end with an operating member 7, of which only a part is shown in FIG. 1 (but which can be of the kind illustrated at 50 in the U.S. specification No. 2,911,165). By the operating member 7, shaft 6 can be axially displaced upwards against the action of a restoring spring 8.

The shaft 6 extends through a hub 9 of the housing 1 and supports at its upper end a line guide cap 10. The borders of the line guide cap 10 extend downwards outside and around the forward flange of a line spool 11 mounted coaxially and immovably on the hub 9. In the peripheral border portion of the line guide cap 10 there is a hole traversed by a pin 12, which can be projected outwards into or inwards out of the periphery of the line guide cap, i.e. into and out of the path of motion of the line 13 running from the spool 11 over the outer edge of the line guide cap 10. Inside the line guide cap 10 the pin is fixedly mounted on a pin slide 14 radially guided on the inside of the line guide cap. The slide 14 has a guiding arm 15 parallel with the line guide pin 12, said arm being provided with a slot 16 equally parallel with the pin 12 and traversed by a bolt 17 fixedly mounted on the inside of the line guide cap 10. A washer 18 fixed at the end of the bolt 17 and a play between the slot 16 and the bolt 17 permit of a limited axial rocking motion of the slide 14 about an axis passing through the hole of the line guide cap 10 traversed by the pin 12 and through the bolt 17. The slide 14 is thus capable of two distinct movements: one radial sliding movement in the longitudinal direction of the pin 12 and one swinging movement in the axial direction of the line guide cap about said axis 12–17. The pin slide is urged radially inwards by a leaf spring 19. The arm 15 extends past one side of the shaft 6 and of the prolongation of the outer cylindrical surface of the hub 9. The slide 14 has an edge 20 extending essentially at right angles to the direction of radial displacement of the slide and cooperating with a peripheral groove 21 with one conical side surface 21a (FIG. 3) at the upper end of the hub 9.

In the positions of the parts illustrated in FIGS. 1 to 3 the said edge 20 has an axial play between both sides of the groove 21. At the side of the slide 14 opposite the arm 15 there is an extension 22 of the edge 20, said extension 22 cooperating with an abutment in the form of a short cylindrical body 23 fixed in the bottom of the line guide cap 10 and connected by a smaller cylindrical and coaxial portion 24 with a disc-shaped stop abutment 25. The middle portion of the edge 20 is so positioned relative to an excentric pin 26 on the end of the hub 9, that the edge 20 can be contacted by said pin 26 for the outwards displacement of the slide 14 as will be understood from the following explanation of the operation of the device.

Operation

In the following, axial movements are designated by upwards and downwards and the positions by lower and upper which refers to the directions and positions as seen in FIG. 1. The radial movements and positions of the pin slide 14 are designated by inward and outward or inner and outer respectively, which refer to the positions, in which the line guide pin 12 is withdrawn within or respectively projected outside the periphery of the line guide cap.

In the position illustrated in FIGS. 1 to 3, which might be called the initial position, because the parts most of the time have this position, the shaft 6 together with the line guide cap 10 is kept in the lower position by the spring 8. The slide 14 is in its outer position and is maintained in this position by the edge 22 resting against the abutment 23 aganst the action of the leaf spring 19, which strives to displace the pin slide 14 inward. When the crank shaft 3 is rotated, the shaft 6 is also rotated by means of the gears 4 and 5, whereby also the line guide cap 10 is rotated together with the slide 14 and the abutment 23 mounted therein. The only part, which in this position is near a non rotating part, is the edge 20, which lies within the groove 21 in the hub 9. As described above said edge 20 has, however, a play between itself and both sides of said groove 21 (see FIG. 1) so that no unnecessary friction exists between the slide and any stationary part. During this rotation of the shaft 6 and the line guide cap 10 the line 13 is caught by the projecting line guide pin 12 and is wound on the spool 11.

At the operation of the operating member 7, the shaft 6 is displaced together with the line guide cap 10 axially upward while the spring 8 is compressed, until a brake pad 27 of known design mounted on the upper side of the cap 10 squeezes line 13 between the brake pad 27 and an outer stationary cap 28, fixedly mounted on the casing 1 and surrounding the spool 11 and the line guide cap 10. During this axial movement of the line guide cap, the slide 14 is displaced axially with the pin 12 and the washer 18 on the bolt 17. The edge 20 of the slide, however, abuts against the upper side of the groove 21 and swings the slide 14 relative to the line guide cap 10 about an axis passing through the hole for the pin 12 and the bolt 17, so that the extension 22 is moved from the abutment 23 to the portion 24 simultaneously as the edges 20 climbs over the upper, conical side 21a of the groove 21 into a position outside the end faces of the hub 9 and the cam or pin 26. The slide 14 is then free for displacement inwards under the action of the leaf spring 19 to the inner position shown in FIG. 5, in which the pin 12 is retracted within the periphery of the line guide cap 10 and out of the path of motion of the line 13. The extension 22 of the edge 20 is then engaged between the abutment 23 and the stop abutment disc 25 and rests against the smaller portion 24. The line 13 being squeezed between the brake pad 27 and the outer cap 28, the throwing out casting motion can be initiated.

When the operating member 7 is released during the throwing motion, the spring 8 displaces the shaft 6 with the line guide cap 10 downwards. If the cam or pin 26 is located under the slide 14, the line guide cap 10 is stopped by the abutment of the slide against the outer end of the pin. If the pin 26 is situated outside the path of motion of the slide, the latter is displaced together with the line guide cap 10 to the position shown in FIGS. 4 and 5 with the slide 14 resting against the end face of the hub 9. In both these cases the slide 14 is still in the inner position and the line can be freely drawn off the spool while the bait flies out.

As soon as the shaft 3 is rotated by means of the crank, the edge 20 will, upon rotation of the shaft 6 and the cap 10, be engaged by the pin 26, which pushes the slide outwards until the edge extension 22 reaches the periphery of the abutment 23 and simultaneously the edge 20 will reach the outer edge of the conical side 21a of groove 21. The cap 10 will then under the action of the spring 8 perform the last part of its axial return motion and the abutment 23 will move beneath extension 22 and edge 20 will be moved axially into groove 21 to the position illustrated in FIGS. 1 to 3. In this position the edge 20 is well away from the path of motion of the pin 26 during rotation of the line guide cap 10, so that the pin 26 cannot hit the edge 20 at each revolution and thus produce disturbing sounds.

Figure 4:
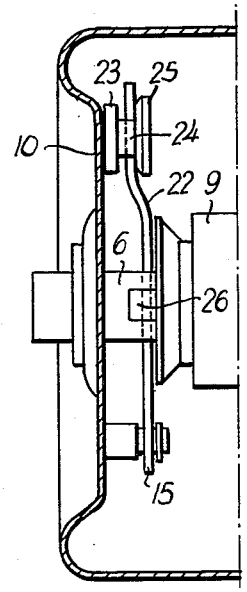

If the slide 14 at the release of the operating member 7 comes to rest on the end surface of the pin 26, the slide will, at the rotation of the line guide cap 10, first be released into contact with the end face of the hub 9 as shown in FIG. 4 and then thereafter be pushed outwards in the manner above described.

What is claimed is:

1. A fishing reel having a line spool and a line guide cap, means mounting said line guide cap for rotative and axial movements, a line guide pin slidably mounted in said cap for radial extension, a slide supporting said pin and mounted in said cap for radial sliding movement and swingable axially about said guide pin, a stationary member to restrict free axial movement of said slide, a stationary cam positioned to engage said slide during rotation of said cap to move said slide radially outwards relative to said cap to radially extend said pin, an abutment secured to said cap to engage and maintain said slide in said pin extended position during rotation of said cap, said cap, when moved axially in a first direction, moving said abutment out of engagement with said slide, said slide's axial movement being limited by said stationary member, and biasing means urging the slide radially inward to retract said pin.

2. A device as set forth in claim 1 and further characterized in that said stationary member is formed as an annulus concentric to the axis of said cap and constructed and arranged to restrict free axial motion of said slide when said abutment is moved away from said slide to permit movement of said slide from the pin extended position to the pin retracted position.

3. A device substantially as set forth in claim 1 and further characterized by means connected to said cap to engage said slide during the movement in said first direction to move said slide axially into the path of said cam.

4. A fishing reel having a line spool and a line guide cap, means mounting said line guide cap for rotative and axial movements, a line guide pin slidably mounted in said cap for radial extension, a slide supporting said pin and mounted in said cap for radial sliding movement and swingable axially about said line guide pin, a stationary member to restrict free axial movement of said slide, a stationary cam positioned to engage said slide during rotation of said cap to move said slide radially outwards relative to said cap to radially extend said pin, an abutment secured to said cap to engage and maintain said slide in said pin extended position during rotation of said cap, said cap then moving said slide axially out of engagement with said cam whereby contact therewith during further rotation is prevented.

References Cited in the file of this patent

UNITED STATES PATENTS

| 2,828,927 | Yeada | Apr. 1, 1958 |

FOREIGN PATENTS

| 610,752 | Canada | Dec. 20, 1960 |
| 1,172,393 | France | Oct. 13, 1958 |